US012702082B2

(12) United States Patent
Hoover

(10) Patent No.: US 12,702,082 B2
(45) Date of Patent: Aug. 11, 2026

(54) APPARATUS FOR INJECTING MANURE INTO THE GROUND

(71) Applicant: Eric Hoover, Oley, PA (US)

(72) Inventor: Eric Hoover, Oley, PA (US)

(*) Notice: Subject to any disclaimer, the term of this patent is extended or adjusted under 35 U.S.C. 154(b) by 837 days.

(21) Appl. No.: 18/097,724

(22) Filed: Jan. 17, 2023

(65) Prior Publication Data

US 2024/0237571 A1 Jul. 18, 2024

(51) Int. Cl.
*A01C 23/02* (2006.01)
*A01C 23/04* (2006.01)

(52) U.S. Cl.
CPC ............ *A01C 23/021* (2013.01); *A01C 23/04* (2013.01)

(58) Field of Classification Search
CPC ..... A01C 23/021; A01C 23/022; A01C 5/066; A01B 13/025; A01B 17/00; A01B 17/008; A01B 23/046; A01B 35/28
USPC ........ 172/161, 133, 145; 111/121, 190, 191, 111/192, 193
See application file for complete search history.

(56) References Cited

U.S. PATENT DOCUMENTS 4,056,226 A 11/1977 Hodgson
4,520,876 A * 6/1985 Peterson .............. A01B 63/163 172/26
4,596,199 A * 6/1986 Dietrich, Sr ........... A01C 5/068 111/192
4,616,579 A 10/1986 Solt
4,723,495 A * 2/1988 Dietrich, Sr. ........ A01C 21/002 111/156
5,531,171 A * 7/1996 Whitesel ................ A01C 5/064 172/604
5,682,829 A 11/1997 Sukup
5,862,763 A * 1/1999 Dietrich, Sr. ........ A01C 23/022 111/121
8,047,299 B2 * 11/2011 Hurtis .................... A01B 63/32 172/174
8,327,780 B2 * 12/2012 Bassett ................ A01C 23/025 111/119
8,550,019 B1 * 10/2013 Reed .................... A01C 23/025 111/166
8,863,857 B2 * 10/2014 Bassett .................... A01C 5/06 111/55
8,875,640 B1 11/2014 Reed
8,910,581 B2 * 12/2014 Bassett .................. A01C 7/208 111/194

(Continued)

*Primary Examiner* — Jamie L McGowan
(74) *Attorney, Agent, or Firm* — Miller Law Group, PLLC

(57) ABSTRACT

An apparatus for injecting liquid manure into the ground in a manner to reduce the odors associated with the use of manure as a fertilizing agent includes a plurality of injector units mounted on a transvers beam. Each injector unit includes an opener disk to form a trench in the ground and a distribution pipe oriented to place liquid manure into the opened trench. Most injector units also include a containment disk that displaces soil on the ground from the formation of the trench by the adjacent injector unit. Each said opener disk being mounted on a machined spindle that enable the opener disk to be oriented in multiple slant angles. Each said distribution pipe terminating in an asymmetrically-shaped boot having a vertical side and a slanted side to define a narrowed discharge opening that directs liquid manure into the trench opened by the operation of the corresponding opener disk.

18 Claims, 15 Drawing Sheets

(56) References Cited

U.S. PATENT DOCUMENTS

| | | | | |
|---|---|---|---|---|
| 9,226,437 | B2 * | 1/2016 | Dietrich, Sr. | A01C 23/023 |
| 9,769,980 | B1 | 9/2017 | Reed | |
| 9,854,733 | B1 * | 1/2018 | Kile | A01C 5/062 |
| 10,842,070 | B2 * | 11/2020 | Peter | A01C 7/201 |
| 11,310,956 | B1 * | 4/2022 | Reed | A01C 7/201 |
| 2004/0245004 | A1 * | 12/2004 | Ruckle | A01B 21/086<br>172/394 |
| 2014/0026792 | A1 * | 1/2014 | Bassett | A01C 23/022<br>111/121 |
| 2018/0054948 | A1 * | 3/2018 | Dietrich, Sr. | A01C 5/066 |
| 2025/0261581 | A1 * | 8/2025 | Albright | A01C 5/064 |

* cited by examiner 11b
35
20
11
39
38
14
15
19
20
16
35
12
30
14
25
10
11a
24
11
21

26b
26
26a
26c
26c
26d 20
55
23
56
58
24
57
35
21
25
30

20
55
56
23
24
30
57
58
35
R
21
25

35
30
24
55
23
56
25
21
20
35
R
30
24
55
23
56
25
21
20

APPARATUS FOR INJECTING MANURE INTO THE GROUND

CROSS-REFERENCE TO RELATED APPLICATIONS

This application claims domestic priority on U.S. Provisional Patent Application Ser. No. 63/302,683, filed on Jan. 25, 2022, the content thereof is incorporated herein by reference.

FIELD OF THE INVENTION

This invention relates generally to manure injectors and, more particularly, to a manure injector with an adjustable angled opener blade, an asymmetrical feed tube for depositing the manure into the slot created by the opener blade and a containment blade that enables a compact configuration.

BACKGROUND OF THE INVENTION

Generally, liquid manure from livestock confinement buildings is commonly collected in pits and lagoons and, ultimately, must be disposed of. Conventionally, the liquid manure is carried by large tank trucks or wagons on which is mounted the manure injector apparatus, and spread on crop or pasture ground to utilize the fertilizer value of the manure. Alternatively, a hose can be deployed to extend from the pit or lagoon from which liquid manure is pumped into the hose and delivered to the apparatus injecting the liquid manure into the ground. This hose could be one to three miles long and is operable to provide a continuous supply of liquid manure under pressure, pumped from the pit or lagoon directly to the injector apparatus. When a hose is utilized to provide a continuous supply of liquid manure, the injector apparatus is typically mounted on the three-point hitch apparatus of a tractor.

Liquid manure generally carries an unpleasant odor, and spraying or spreading the liquid manure on the surface of the ground allows the odor to permeate the surrounding area. In addition, the placement of liquid manure on the surface of the ground often leads to displacement of the liquid manure due to rains and the movement of the manure into local streams causing pollution. Accordingly, some attempts have been made to inject the liquid manure into the ground by apparatus using knives or disks to create a small trench into which the liquid manure can be injected, and then covered through the use of trailing containment disks to keep the liquid manure below the surface of the ground. Such attempts have proven to be unsatisfactory in the past because some of the injected material remains on top of the ground, and the liquid tends to flow longitudinally along the trench when uneven terrain is encountered. Modern devices for injecting liquid manure into the ground have largely resolved these concerns, though improvement is still desired.

In U.S. Pat. No. 4,056,226 granted to James Hodgson on Nov. 1, 1977, represents an early approach to the injection of liquid manure or other fertilizer into the ground. This apparatus uses a disk to open the ground, followed by a chisel to form a trench behind which an injector nozzle places liquid manure into the formed trench. Such devices suffered from the problems identified above in that the trench wasn't properly closed and liquid manure remained somewhat on the ground. In U.S. Pat. No. 4,616,579, granted on Oct. 14, 1986, to Wayne Solt, the opener device is a horizontal disk forming a wide underground slit into which the liquid manure is deposited. This device suffered from placement problems and from the lack of consistency in the formation of the underground slit by the horizontal disk that is intended to remain below the surface of the ground.

Substantial improvements in devices for injecting liquid manure into the ground are shown in U.S. Pat. No. 5,682,829 issued to Eugene Sukup on Nov. 4, 1997. In the Sukup apparatus, a tilted opener disk cuts a trench into the surface of the ground and a discharge nozzle centered over the formed trench at the trailing edge of the opener disk to drop liquid manure into the opened trench. A spoked cover wheel is mounted on a tilted axis of rotation trailing the opener disk to push the soil back into the formed trench to cover the liquid manure placed therein.

Philip Reed has been granted three patents for an apparatus for injecting liquid manure into the ground, including U.S. Pat. No. 8,550,019, issued on Oct. 8, 2013; U.S. Pat. No. 8,875,640, issued on Nov. 4, 2014; and U.S. Pat. No. 9,769,980, issued on Sep. 26, 2017. These patents disclose an apparatus that is formed with a plurality of transversely spaced injection units, each of which having a vertically oriented opener coulter disk to form a trench into the ground, a discharge hose located completely behind the opener blade to deposit liquid manure into the formed trench, and rearward of the discharge hose, a pair of tilted containment wheels that direct soil back into the formed trench to cover the liquid manure deposited therein.

It would be desirable to provide an apparatus for injecting liquid manure into the surface of the ground that overcomes the disadvantages of the prior art. It would also be desirable to provide an opener disk for a manure injector that can be selectively positioned to vary the width of the formed trench. It would further be desirable to provide a configuration for the injection units that permit a compact configuration.

SUMMARY OF THE INVENTION

It is an object of this invention to overcome the disadvantages of the prior art by providing an apparatus for injecting manure into the ground in a manner.

It is another object of this invention to improve the operation of manure injectors so that the odors associated with such operations are diminished.

It is an advantage of this invention that the liquid manure distributed to the ground is immediately covered by soil to be trapped beneath the surface of the ground.

It is a feature of this invention that the apparatus for injecting liquid manure into the ground includes a plurality of injector units mounted on a transverse beam with each injector unit having an opener disk and being associated with a containment disk to cover the liquid manure placed into the trench formed by the opener disk.

It is another feature of this invention that the containment disk on one injector unit covers the trench formed by the opener disk on an adjacent injector unit.

It is another advantage of this invention that the opener disk and the containment disk on each respective injector unit throws soil in opposite directions.

It is still another advantage of this invention that the containment disks on one side of the transverse beam displace soil in one direction, while the containment disks on the opposing side of the transverse beam displace soil in the opposite direction.

It is still another feature of this invention that the central part of the transverse beam includes containment disks that make a transition from one direction of displacement to the other.

It is yet another feature of this invention that each opener disk can be selectively oriented into different slant angles.

It is yet another advantage of this invention that the selective orientation of the opener disk can be accomplished with a rotatable spindle machined to have a bend that changes the slant angle when the spindle is rotated.

It is still another object of this invention to provide an asymmetrical boot at the discharge end of the distribution pipe to direct the flow of liquid manure into the trench formed by the corresponding opener disk.

It is yet another feature of this invention that the asymmetrical boot is formed with a vertical side positioned over the formed trench, and a slanted side that is directed toward the vertical side to establish a narrowed discharge opening over the open trench.

It is a further advantage of this invention that the asymmetrical boot structure creates a laminar flow pattern for the liquid manure being discharged into the open trench.

It is yet another object of this invention to provide an apparatus for injecting liquid manure into a trench formed in the ground by an opener disk and immediately covered with the soil displaced by the adjacent opener disk to minimize the odors associated with the use of liquid manure as fertilizer on farm fields.

These and other objects, features and advantages are accomplished according to the instant invention by providing an apparatus for injecting liquid manure into the ground in a manner to reduce the odors associated with the use of manure as a fertilizing agent that includes a plurality of injector units compactly mounted on a transverse beam. Each injector unit includes an opener disk to form a trench in the ground and a distribution pipe oriented to place liquid manure into the opened trench. Injector units also include a containment disk that displaces soil on the ground from the formation of the trench by the adjacent injector unit. Thus, the opener disk and the containment disk on each injector unit displace soil in opposite directions. Each said opener disk being mounted on a machined spindle that enable the opener disk to be oriented in multiple slant angles. Each said distribution pipe terminating in an asymmetrically-shaped boot having a vertical side and a slanted side to define a narrowed discharge opening that directs liquid manure in a laminar flow pattern into the trench opened by the operation of the corresponding opener disk.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENTS

Figure 1:
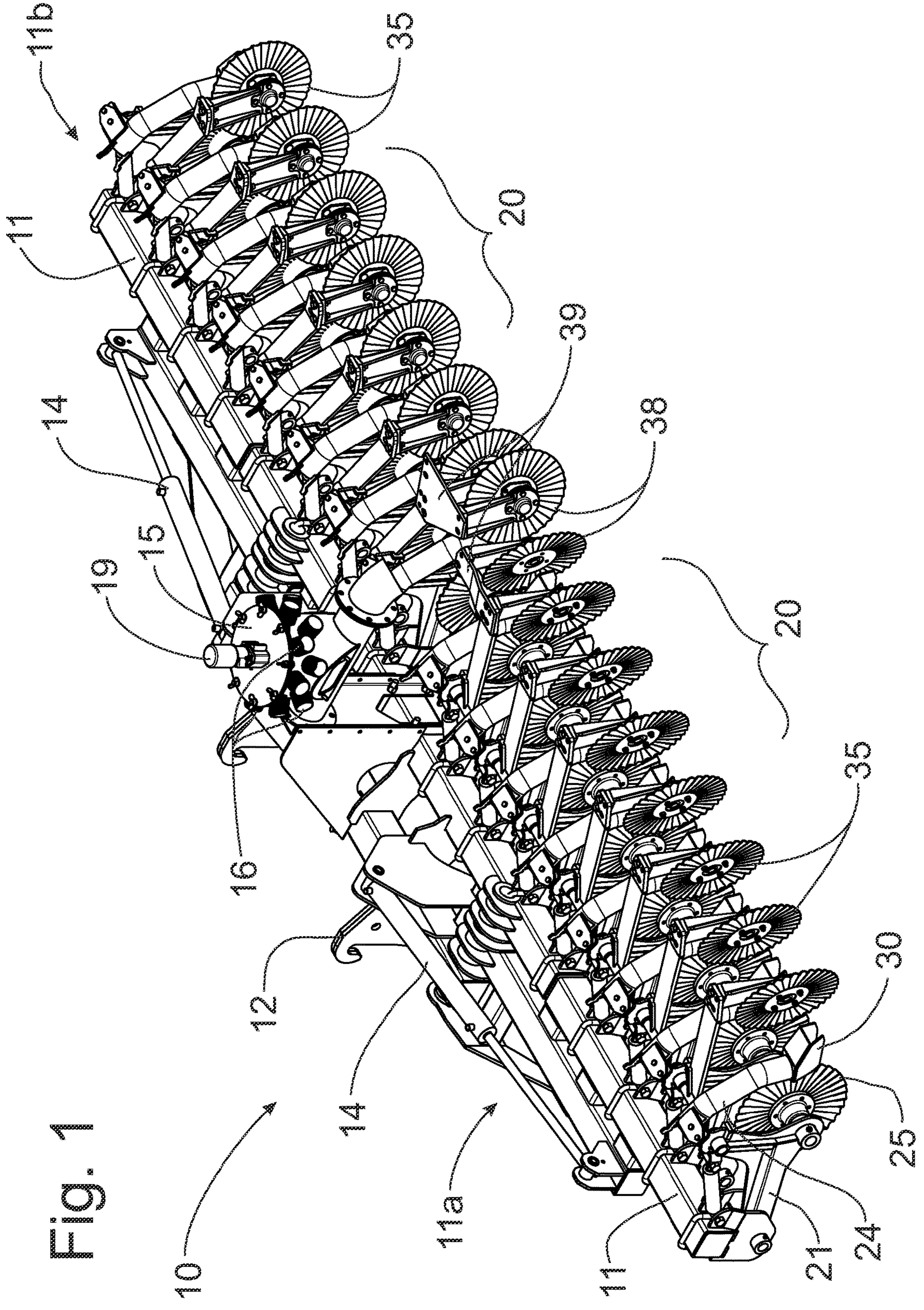
FIG. 1 is a left, rear perspective view of the apparatus for injecting manure into the ground incorporating the principles of the instant invention, the swing boom and hoses being removed for purposes of clarity.
Figure 2:
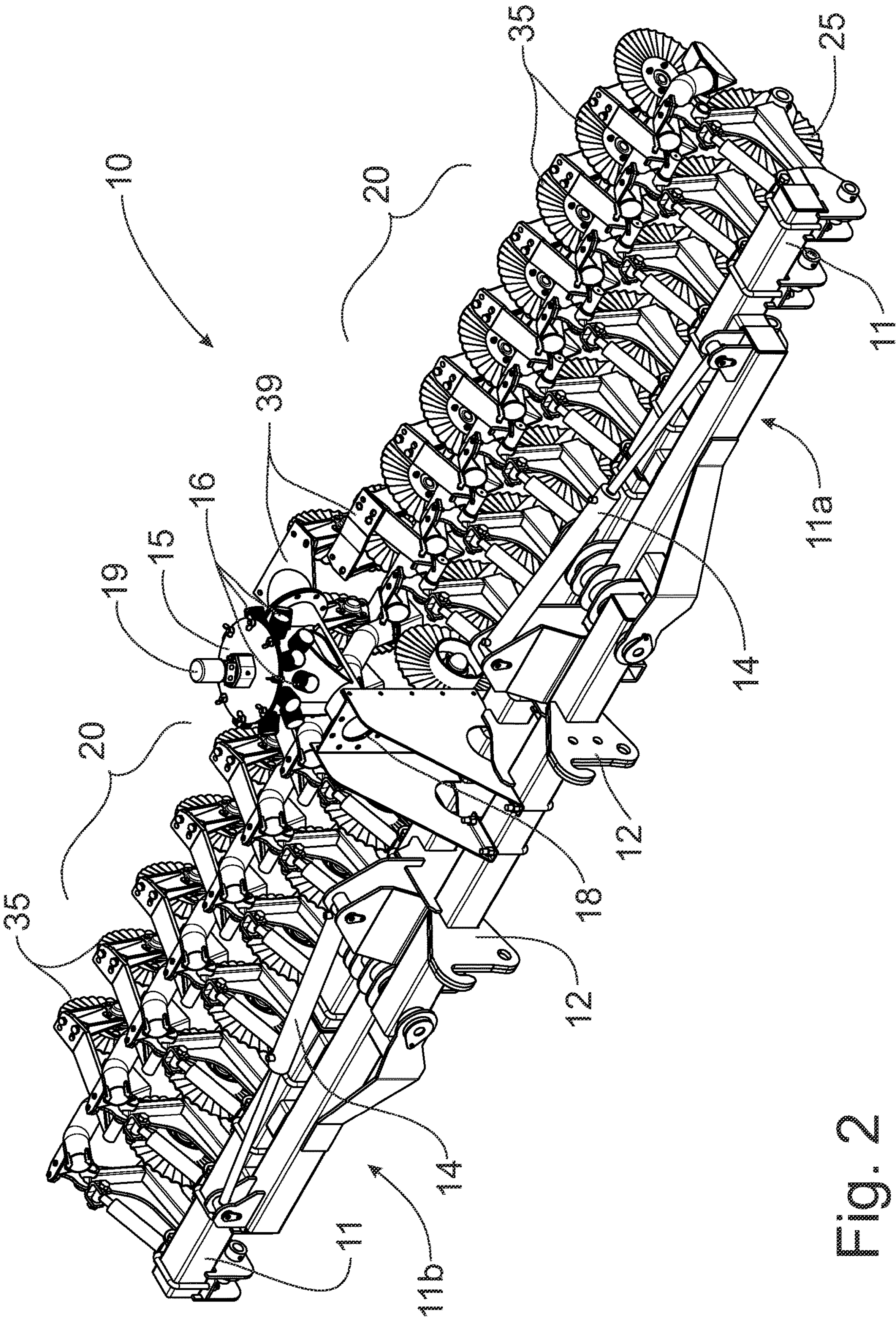
FIG. 2 is a left, front perspective view of the apparatus for injecting manure into the ground as depicted in FIG. 1.
Figure 3:
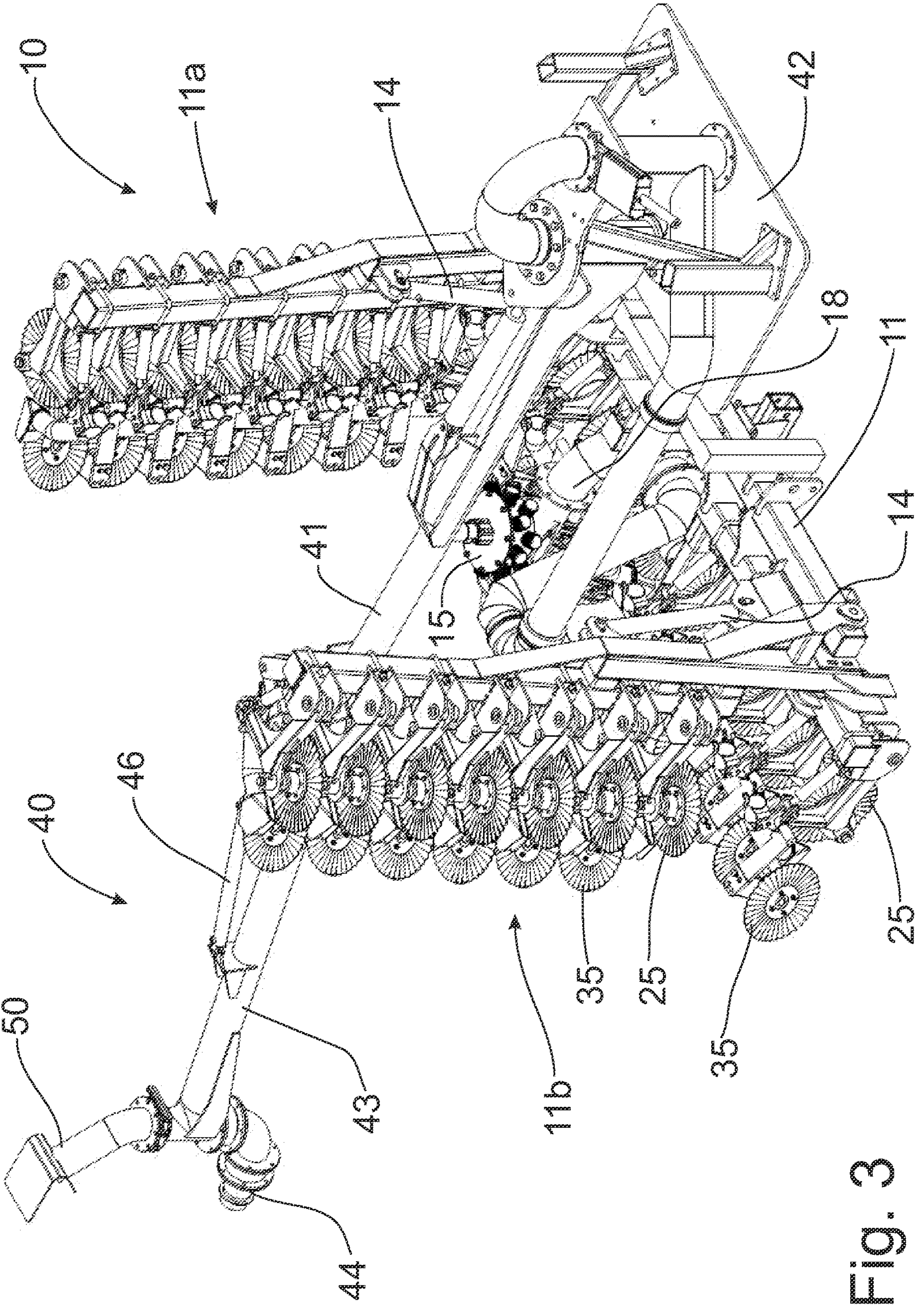
FIG. 3 is a right, front perspective of the apparatus for injecting manure into the ground with the left and right wings being pivotally raised into a transport position, and with the swing boom extended into the operative position, hoses being removed for purposes of clarity.
Figure 4:
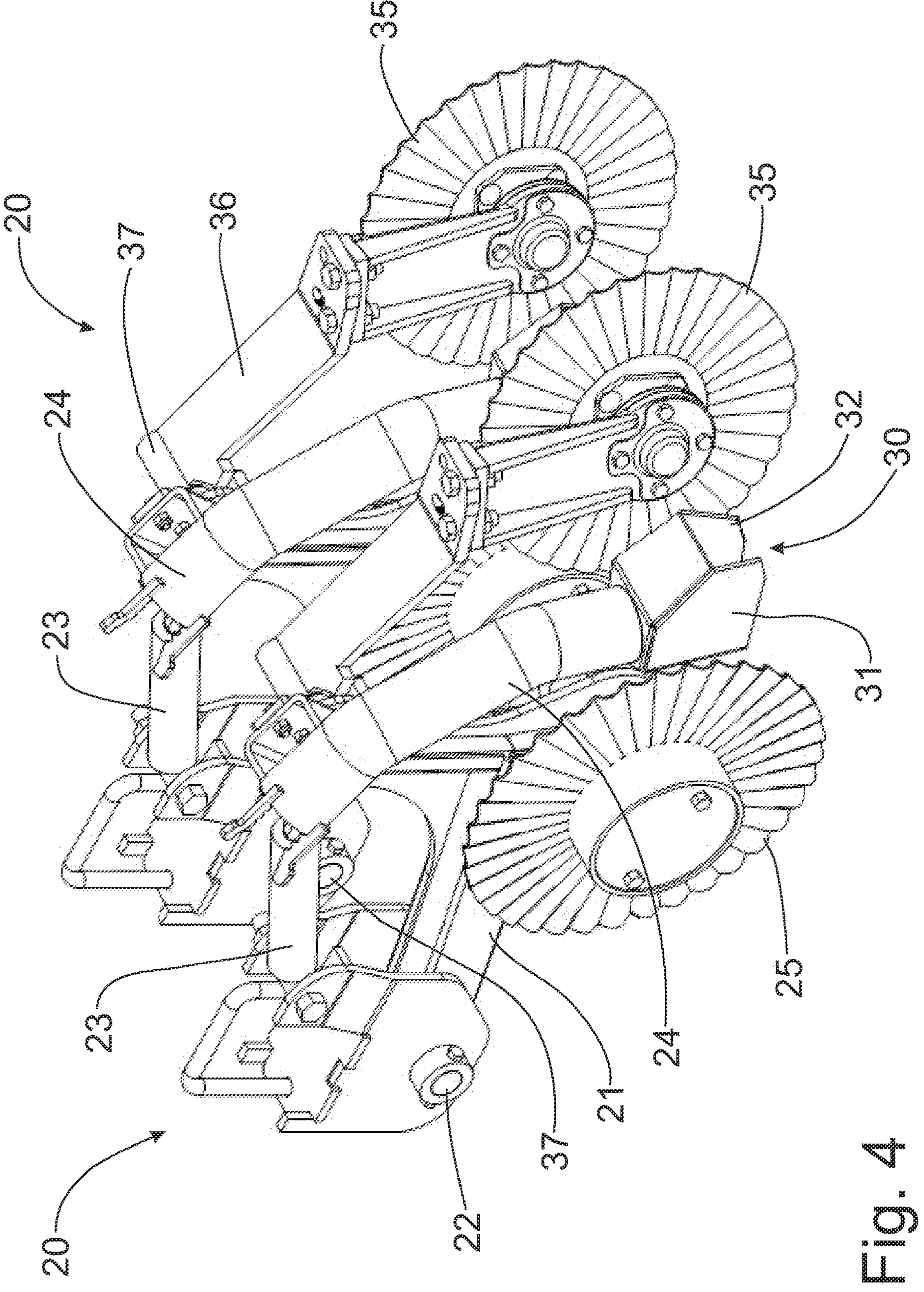
FIG. 4 is an enlarged left, rear perspective detail view of two adjacent injector units from the apparatus depicted in FIG. 1.
Figure 5:
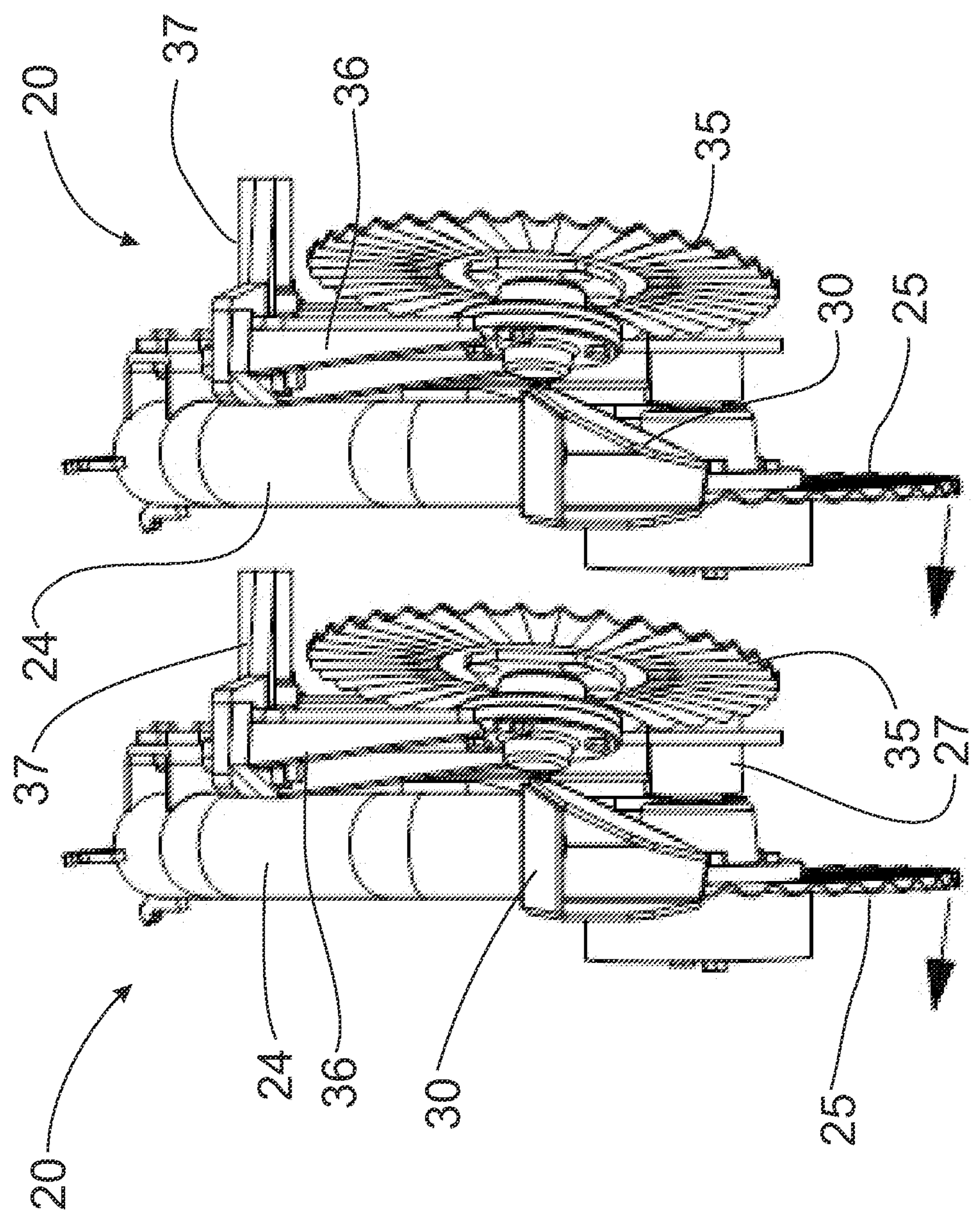
FIG. 5 is an enlarged rear elevational view of the two adjacent injector units depicted in FIG. 5 from the right side of the apparatus.

Referring now to FIGS. 1-3, an apparatus for injecting liquid manure into the ground and incorporating the principles of the instant invention can best be seen. The apparatus 10 includes a transversely extending, bifurcated beam 11 defining left and right ends 11*a*, 11*b* that pivot to raise the left and right ends 11*a*, 11*b* vertically for transport, as shown in FIG. 3. The beam 11 is provided with a mounting device 12 that can support the apparatus from a three-point hitch (not shown) at the rear of a tractor, or from the rearward end of a tank (not shown) containing a supply of liquid manure to be injected into the ground. The transversely extending beam 11 supports a plurality of individual injector units 20 that are connected by flexible hoses (not shown) to a distribution hub 15 centrally located on the apparatus to deliver liquid manure to the individual injector units 20, as described in greater detail below.

Figures 6, 7, 8, 9:
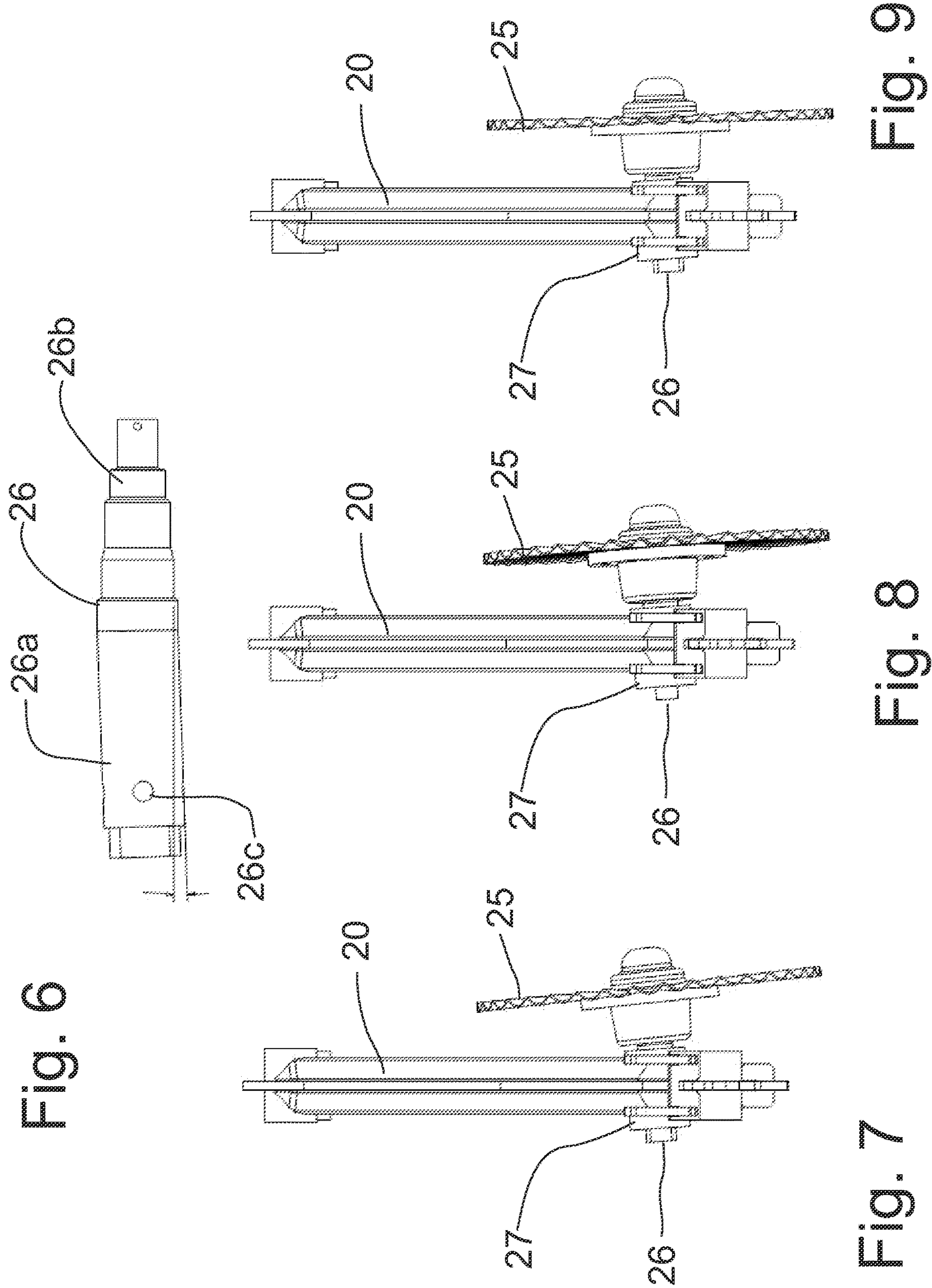
FIG. 6 is an elevational view of the machined spindle mounting the opener disks.
FIG. 7 is a rear elevational view of the opener disk set at a six degree slant.
FIG. 8 is a rear elevational view of the opener disk set at a four degree slant.
FIG. 9 is a rear elevational view of the opener disk set at a two degree slant.
Figure 6A:
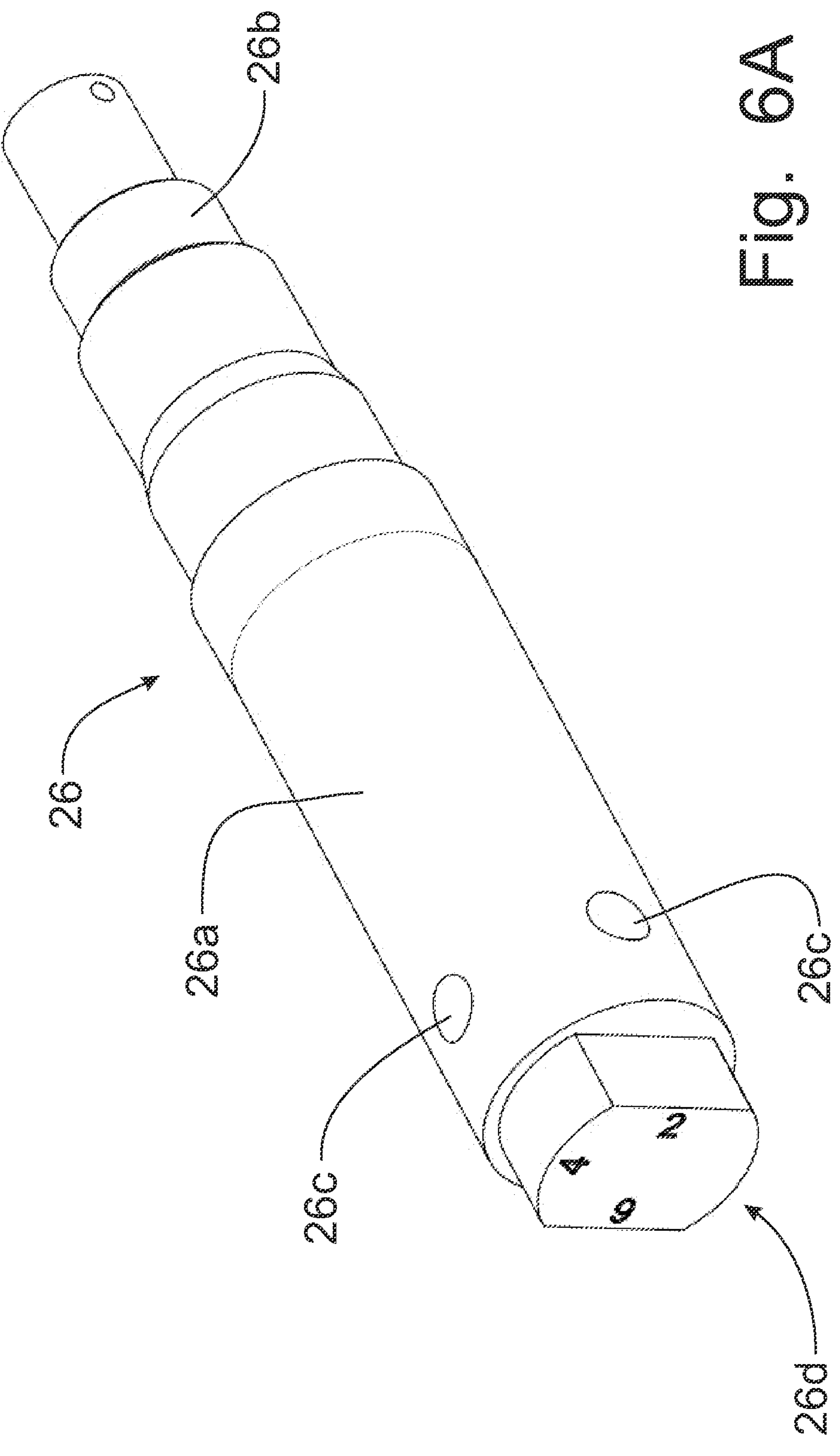
FIG. 6A is an enlarged perspective view of the spindle shown in FIG. 6.

As best seen in FIGS. 4-9, each individual injector unit 20 includes a rearwardly extending arm 21 pivotally supported from the transverse beam 11 by a pivot 22 and positionally controlled by a hydraulic cylinder 23 that is operable to push the rearward distal end of the individual injector unit 20 toward the ground. The rearwardly extending arm 21 rotatably supports an opener disk 25 mounted on a machined spindle 26 received at one end within a hub 27 formed in the rearwardly extending arm 21. The spindle 26 is shown in FIGS. 6 and 6A and includes a support end 26*a* that is received within the hub 27 and a distal cantilevered end 26*b* that supports the rotatable opener disk 25 to the side of the arm 21. The hub 27 is secured in the arm 21 at a four degree angle relative to horizontal. The cantilevered end 26*b* is angled relative to the support end 26*a* at a two degree angle, as is reflected in FIG. 6.

The support end 26*a* of the spindle 26 is locked against the hub 27 by a fastener (not shown) that extends through the opening 26*c* in the spindle 26. As show in FIGS. 7-9, the positioning of the spindle 26 so that the two degree bend of the cantilevered end 26*b* projects upwardly from the canted hub 27 results in a six degree slant to the opener disk 25, as depicted in FIG. 7. By removing the fastener from the spindle 26 and turning the spindle 26 so that the two degree bend of the cantilevered end 26*b* is generally horizontal with respect to the canted hub 27 places the bend of the cantilevered end 26*b* in the plane of the canted hub 27 to result in the opener disk having a slant of four degrees. If a shallower slant angle for the opener disk 25 is desired, the fastener is again removed and the spindle 26 turned so that the two degree bend of the cantilevered end is projected down from the slope of the canted hub 27 and resulting in a slope of two degrees for the opener disk 25. As is reflected in the view of the spindle 26, the support end 26*a* of the spindle 26 preferably is marked at the end 26*d* thereof with numbers identifying the rotation of the spindle 26 and the resulting slant angle of the opener disc 25.

The greater the slope of the opener disk, the wider the formed trench will be during operation of the apparatus 10. The shallower the slope of the opener disk 25, the less disturbed the surface of the ground will be. Thus, if the liquid manure is to be injected into the ground where crop is currently growing, the shallow slope of the opener disk 25 will cause less damage to the growing crop. On the other hand, the wider the trench is formed, the greater volume of liquid manure can be placed under the surface of the ground. To facilitate the removal of the fastener from each of the plurality of injector units 20, the hydraulic cylinder 23 on alternative injector units 20 are connected to different circuits so that every other injector unit 20 can be vertically positioned relative to the adjacent injector unit 20 to permit convenient access to the fasteners (not shown).

Figure 10:
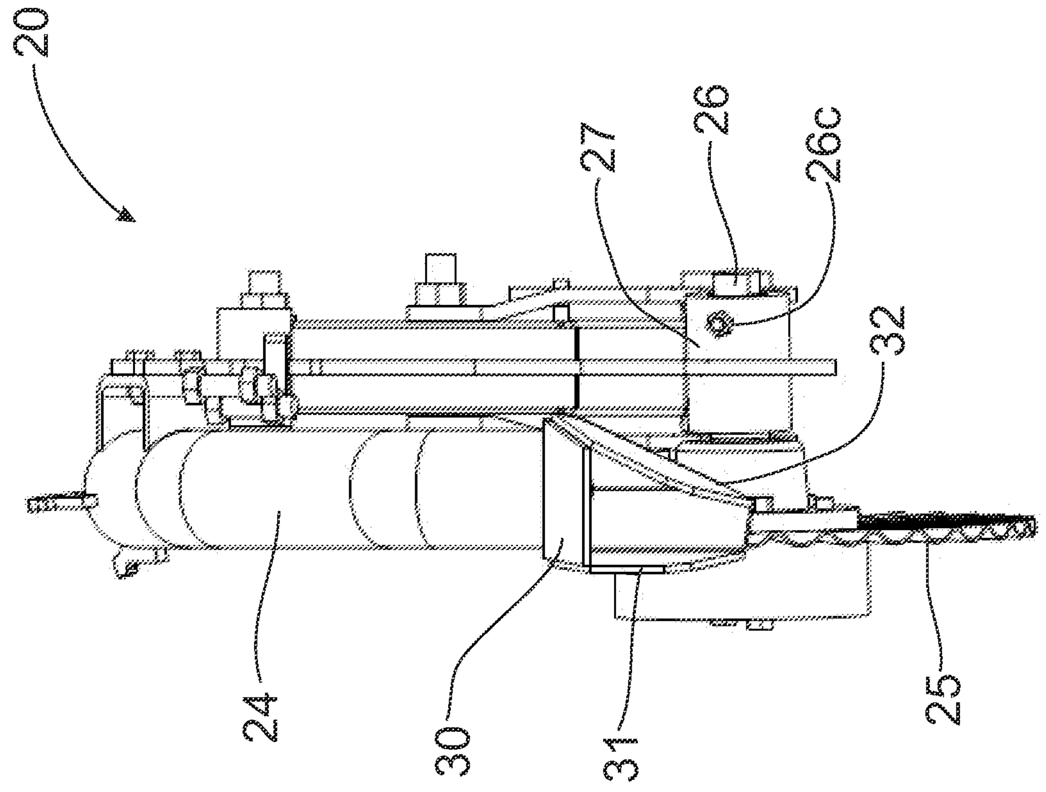
FIG. 10 is a rear perspective view of the discharge pipe on an injector unit showing the asymmetrical boot for directing the flow of liquid manure into the trench formed by the opener disk.
Figure 12:
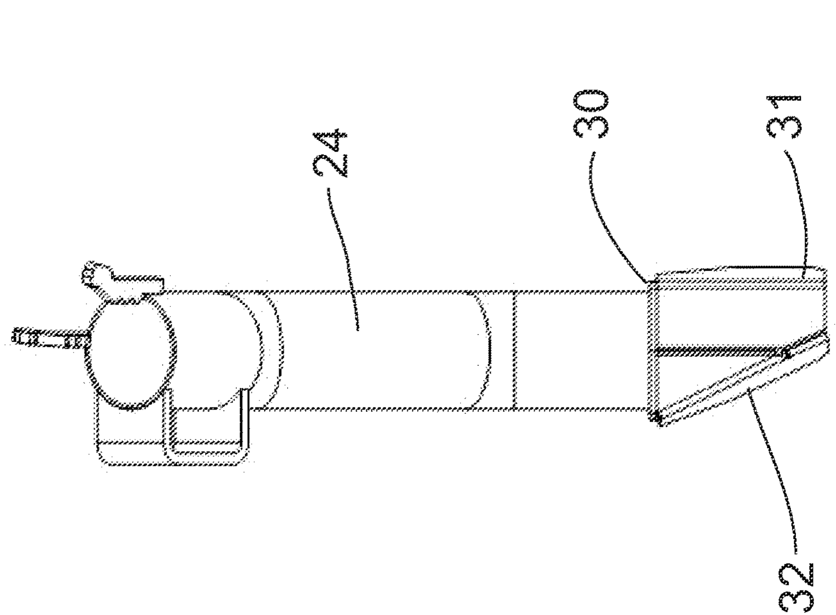
FIG. 12 is a rear elevational view of the discharge pipe.
Figure 11:
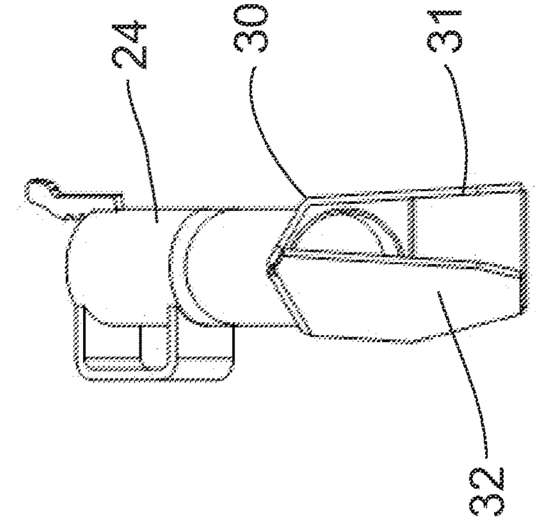
FIG. 11 is a bottom view of the discharge pipe shown in FIG. 10 to show the rectangular opening of the boot.

Referring first to FIGS. 1-3, the distribution hub 15 has a plurality of outlet ports 16 spaced around the circumference of the distribution hub 15. Liquid manure is fed into the distribution hub 15 under pressure, as will be described in greater detail below, and is discharged from the distribution hub 15 through the outlet ports 16. A hydraulic motor 19 is mounted on top of the distribution hub 15 to power an internal rotating blade device (not shown) that assists in discharging liquid manure through the outlet ports 16. Each respective outlet port 16 is connected by a flexible hose (not shown) to a selected one of the discharge pipes 24 on the individual injector units 20. Accordingly, each injector unit 20 has a dedicated supply of liquid manure from the distribution hub 27. The discharge pipes 24 are best seen in FIGS. 10-12. The discharge pipes 24 are formed in a rigid manner from metal or other suitable material, such as fiberglass, and can be supported on the rearwardly extending arm 21 in a fixed location, or equipped with a breakaway apparatus 55, as described in greater detail below.

Each discharge pipe 24 includes an asymmetrically formed boot 30 at the distal end thereof that is positioned to the side of the opener disk 25. The boot 30 has a vertical side 31 that is located adjacent to the opener disk 25, and a slanted side 32 that is transversely spaced from the vertical side 31. The slanted side 32 is oriented so that the lowermost edge is closer to the vertical side 31 than the uppermost portion thereof. As can be seen in FIG. 11, the slanted side 32 covers more than half of the opening of the corresponding discharge pipe 24. As a result, the discharge of liquid manure from the discharge pipe 24 is deflected laterally toward the vertical side which contains the flow of liquid manure into a flat laminar pattern that is efficiently directed into the trench formed by the opener disk 25.

As is best seen in FIGS. 17-20, an alternative mounting arrangement for the discharge pipes 24 can include a breakaway apparatus 55 that will minimize a likelihood of damage should the discharge pipe 24 strike an immovable object such as a rock R. The breakaway apparatus 55 requires that the discharge pipe 24 be pivotally supported rearwardly extending arm 21 by a pivot 56. A reset spring 57 urges the discharge pipe 24 downwardly against a stop 58 which defines the operating position of the discharge pipe 24 relative to the opener disk 25. Should the distal end of the discharge pipe 24 strike an object R lodged in the ground, the distal end of the discharge pipe 24 is free to raise over top of the object R against the biasing force of the reset spring 57. Once the discharge pipe 24 has cleared the object R, the reset spring 57 returns the discharge pipe 24 against the stop 58 and back into the operating position. Such an alternative mounting arrangement for the discharge pipe 24 would be highly advantageous in certain soil conditions, and essentially useless in other soil conditions. Therefore, this breakaway apparatus 55 can be treated as an optional feature.

Referring now to FIGS. 1-4, the containment disk 35 is shown positioned slightly rearwardly of the discharge pipe 24 and boot 30 on the distal end thereof. The spatial relationship of the containment disk 35 is such that the lowermost peripheral edge of the rotatable and slanted containment disk 35 engages the soil displaced by the opener disk 25 from the formed trench onto the adjacent surface of the ground and laterally pushes the displaced soil back into the trench to immediately cover the liquid manure deposited therein. Except for the central containment disks 39, as described in greater detail below, each containment disk 35 is rotatably mounted on the end of a mounting arm 36 that is pivotally supported by a pivot hub 37 formed on the rearwardly extending frame structure 21 of the adjacent injector unit 20. Thus, the first containment disk 35 that covers the trench formed by the first opener disk 25 at the end of the apparatus 10 is pivotally supported on the second injector unit 20.

This mounting arrangement for the containment disks 35 allows for a compact spacing of the individual injector units 20 along the transverse length of the beam 11. One skilled in the art will recognize that this mounting arrangement for the containment disks 35 is best implemented from the opposing ends of the transverse beam 11. Therefore, the containment disks 35 of the left end 11*a* of the beam 11 are angled to displace soil to the left to cover the respective trenches, while the containment disks 35 of the right end 11*b* of the beam 11 are angled to displace soil to the right to cover the respective trenches. This opposing mounting arrangement is maintained to the center of the apparatus 10 where the two center containment disks 38 are double mounted by a support bracket 39 on the mounting arm 36 for the adjacent injector unit 20.

Figure 13:
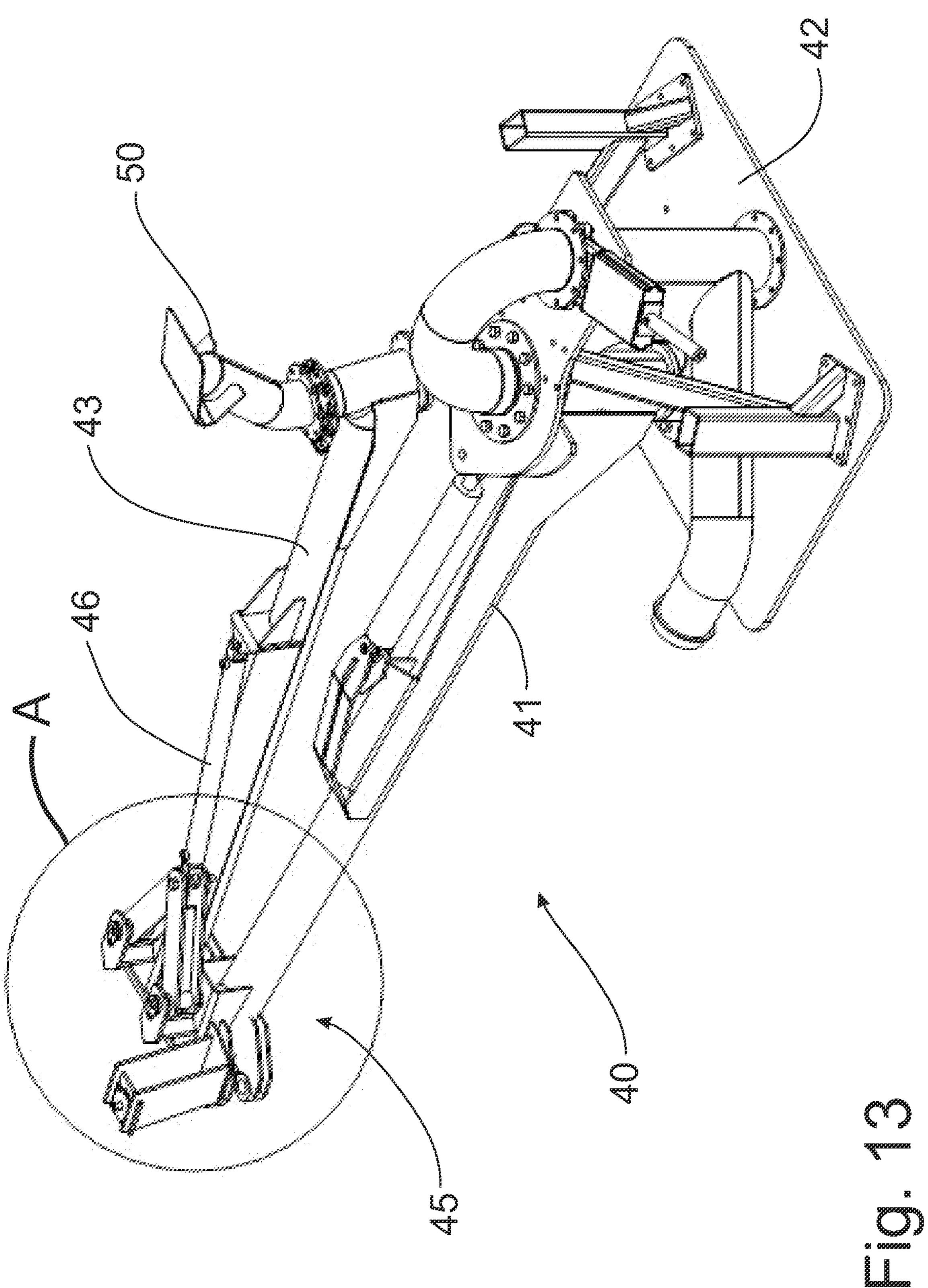
FIG. 13 is a left, front perspective view of the swing boom folded into a transport position.

As indicated above, the supply of liquid manure is typically provided by a tank (not shown) or a long flexible supply hose (not shown) that interconnects the pit or lagoon containing the supply of liquid manure and the distribution hub 15. In either case, a hose or pipe interconnects the supply of liquid manure and an inlet port 18 in the front of the distribution hub 15. When the apparatus 10 is to be used in conjunction with a supply hose extending from the manure pit or lagoon to the moving apparatus 10, a swing boom 40 is provided to make a safe connection with the supply hose. The swing boom 40 includes a fixed front portion 41 and a pivotable rearward portion 43. When the apparatus 10 is in a transport configuration, the left and right ends 11*a*, 11*b* of the transverse beam 11 are pivoted upwardly to be generally vertical by the hydraulic lift cylinders 14, and the rearward portion 43 of the swing boom 40 is pivoted to extend forwardly, as depicted in FIG. 13. In an operative configuration, the rearward portion 43 is pivoted to extend rearwardly for connection to the supply hose.

The rearward end 43 of the swing boom 40 includes a locking collar 44 that connects securely to the supply hose (not shown). When in the operative configuration, the front and rearward portions 41, 43 are in flow communication so that the supply of liquid manure under pressure travels forwardly through the piping supported by a plate 42 mounted on the tractor (not shown) and ultimately reach the inlet port 18 to supply liquid manure to the outlet ports 16. This long supply hose is cleaned by inserting a “pig” (a round ball having a diameter about the same as the diameter of the supply hose), and allowing the “pig” to flow through the supply hose and push the liquid manure within the supply hose to the swing boom 40. Preferably, the “pig” emerges through the escape port 50 located above the locking collar 44 rather than make the ninety degree turn to continue forwardly within the swing boom 40, as this would require some disassembly of the swing boom 40 to remove the “pig” from the apparatus 10.

Figure 14:
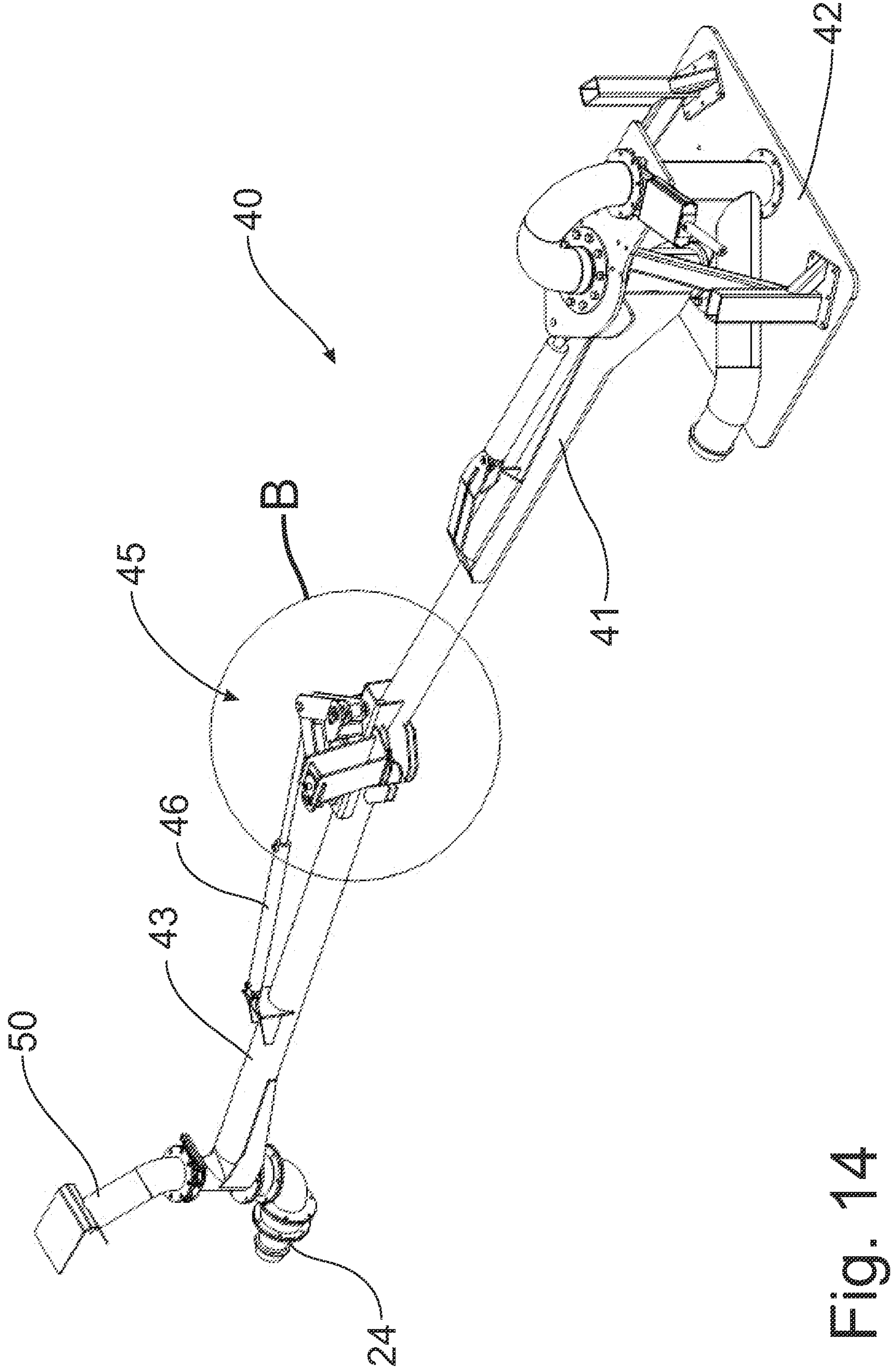
FIG. 14 is a left, front perspective view of the swing boom unfolded into an operating position for connection with a supply hose.
Figure 15:
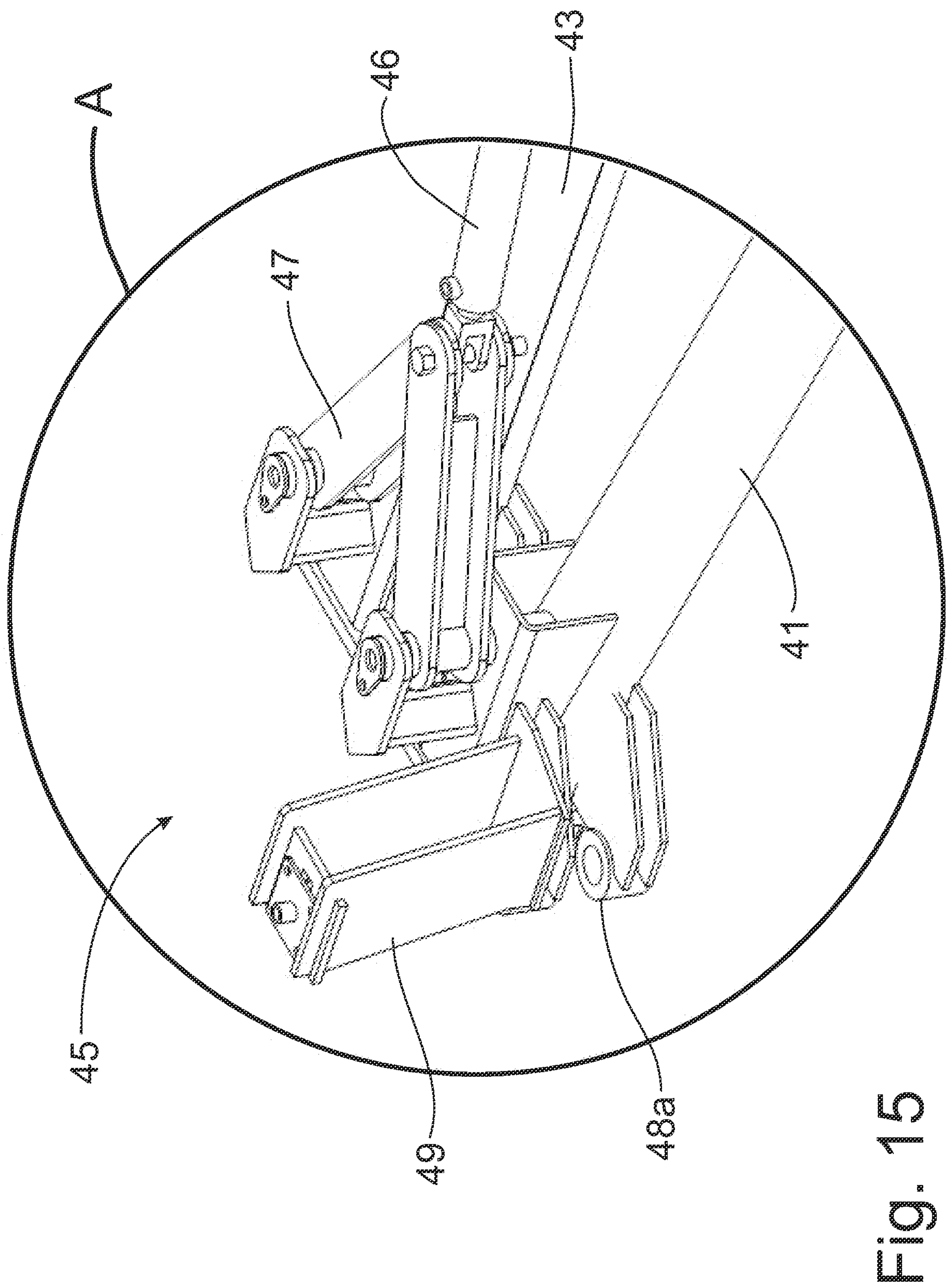
FIG. 15 is an enlarged detail view of the pivot joint of the swing boom in the folded position corresponding to Circle A in FIG. 13.
Figure 16:
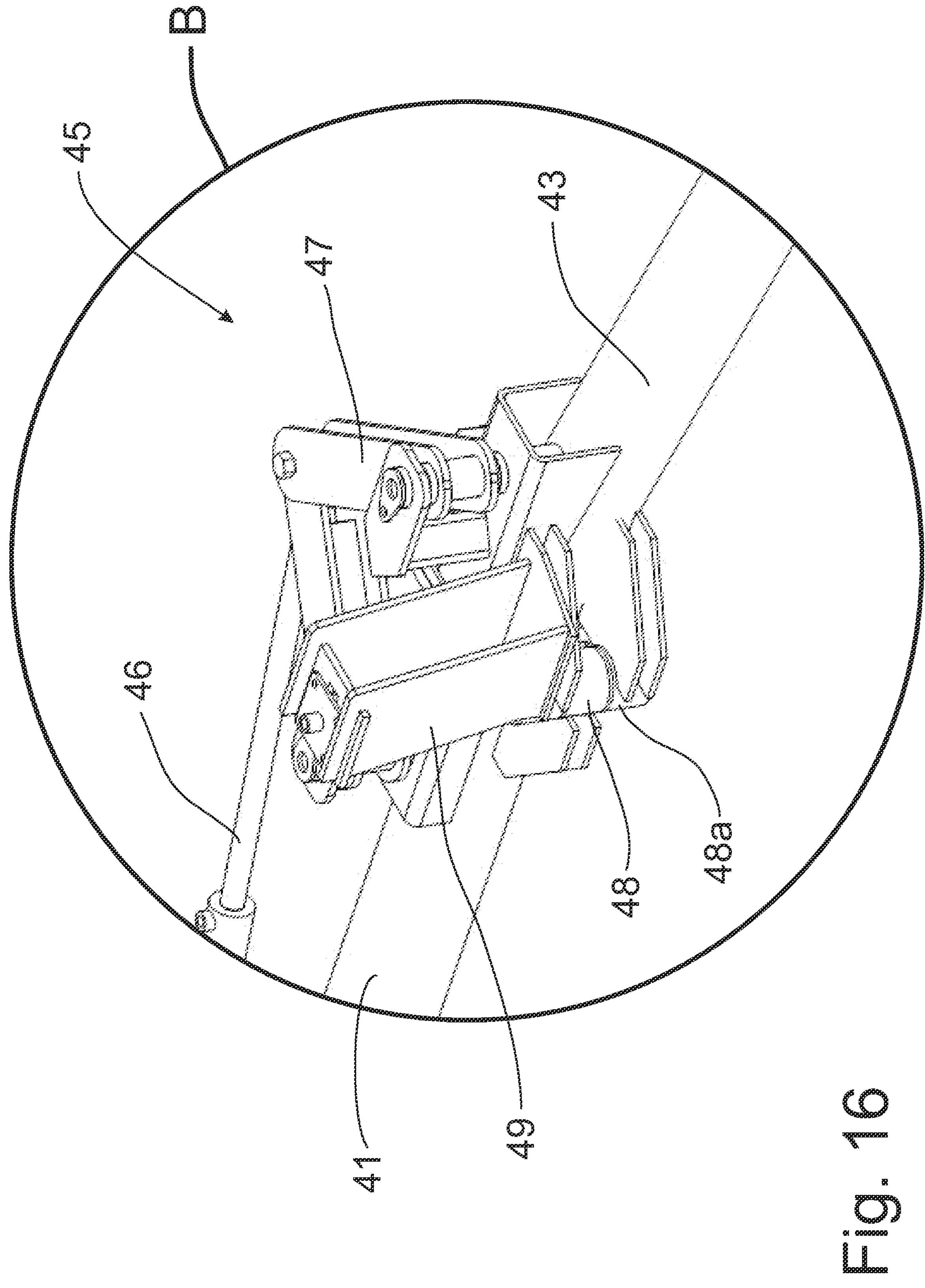
FIG. 16 is an enlarged detail view of the pivot joint of the swing boom in the operating position corresponding to Circle B in FIG. 14.
Figure 17:
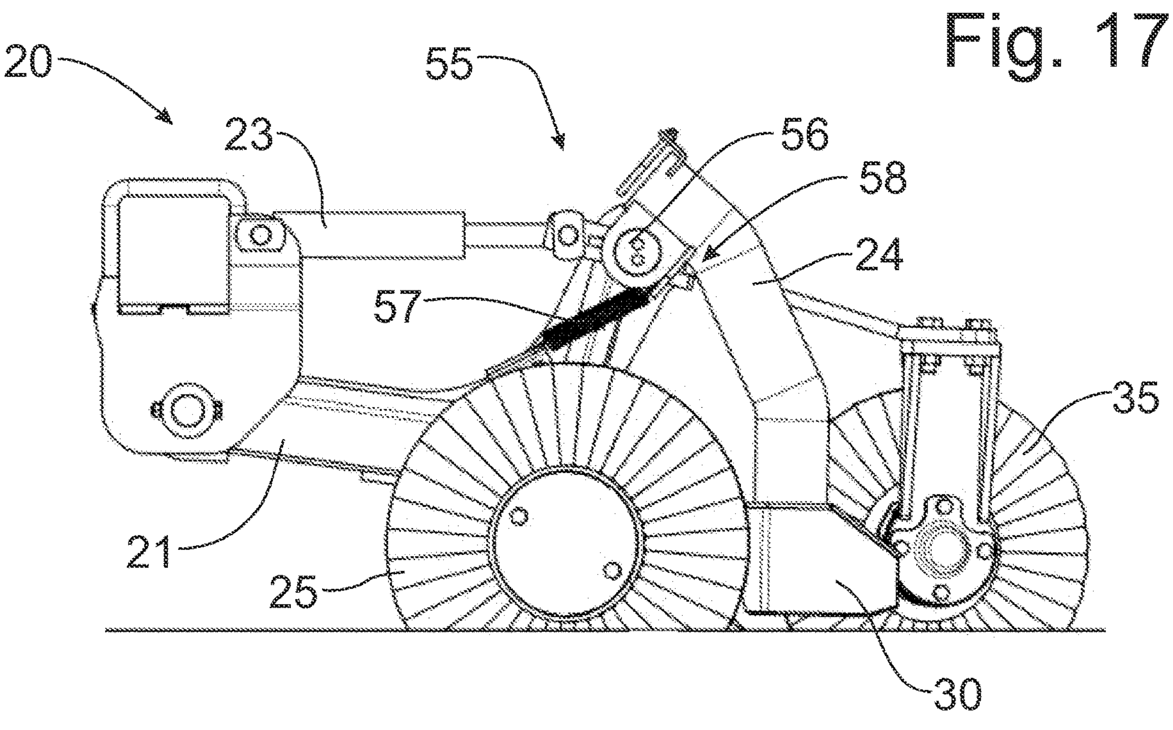
FIG. 17 is a side elevational view of an injector unit in which the distribution pipe is supported by a breakaway apparatus, the boot of the distribution pipe being positioned in the operating position.
Figure 18:
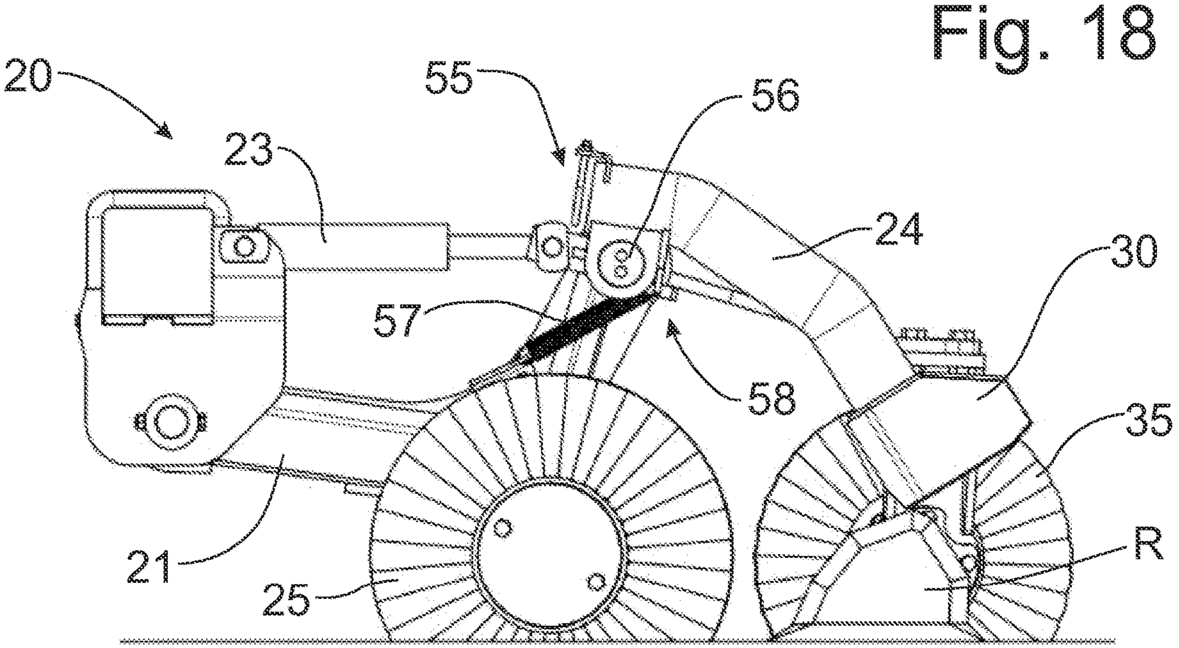
FIG. 18 is a side elevational view of an injector unit similar to that of FIG. 17 but with the distribution pipe raised through the operation of the breakaway apparatus to pass over an immovable object.
Figures 19, 20:
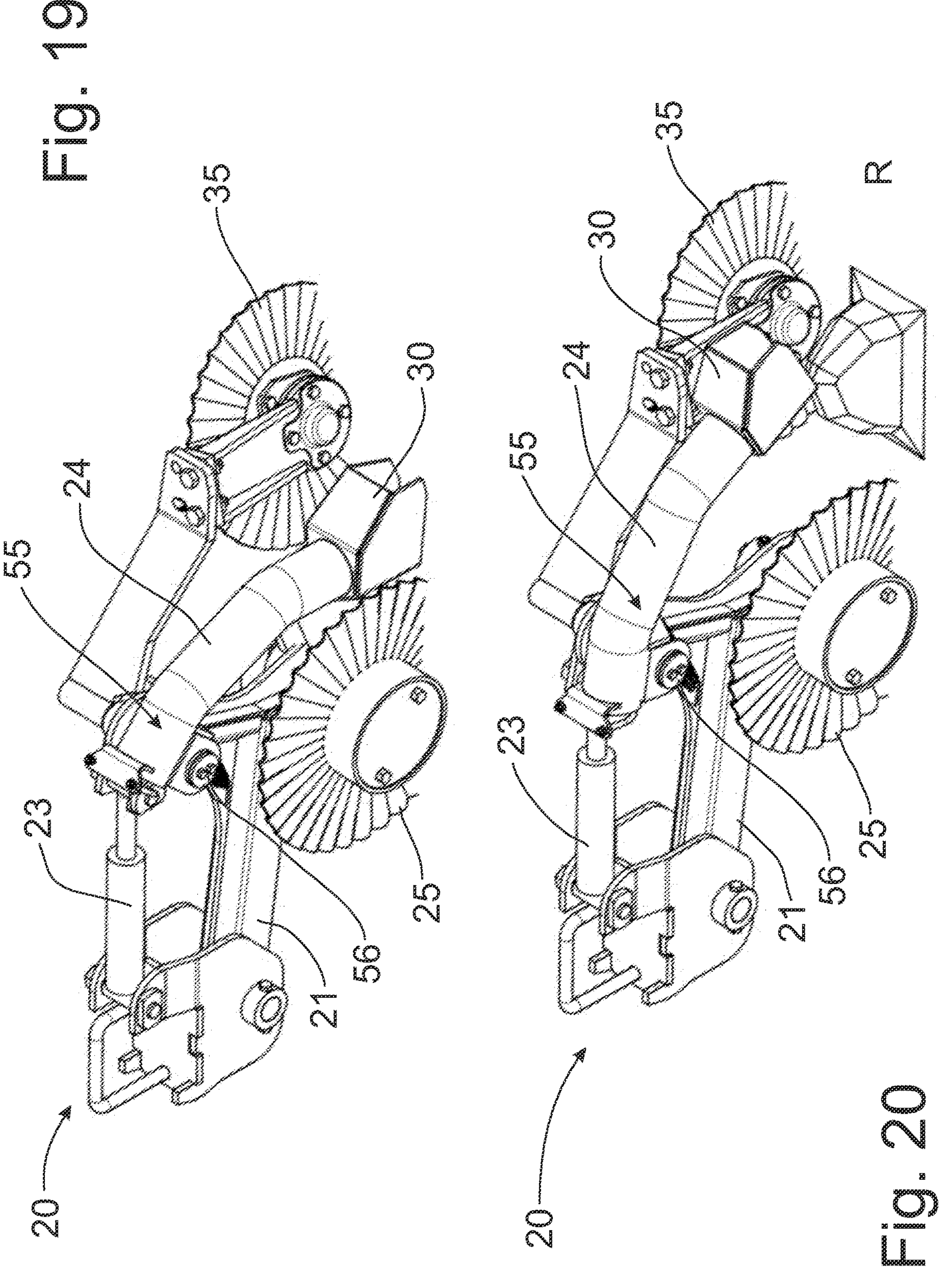
FIG. 19 is a perspective view of the injector unit as shown in FIG. 17.
FIG. 20 is a perspective view of the injector unit as shown in FIG. 18.

The pivot joint 45 interconnecting the forward and rearward portions 41, 43 of the swing boom 40 is operable to seal the two portions of the swing boom 40 and to lock them together. A long hydraulic cylinder 46 mounted on the rearward portion 43 connects to a pivot linkage 47. When the hydraulic cylinder 46 is fully extended, as is depicted in FIGS. 14 and 16, the rearward portion 43 is pivoted into alignment with the forward portion 41. A locking hub 48 mounted on the rearward portion 43 is positioned in alignment with a receiver hub 48*a* mounted on the end of the forward portion 41, whereupon a locking pin (not shown) forming part of the locking housing 49 is inserted through the aligned locking hub 48 and receiver hub 48*a* to retain the rearward portion 43 in flow communication with the forward portion 41. After the locking pin has been removed from the locking hub 48, the long hydraulic cylinder 46 can be retracted to cause the rearward portion 43 to pivot into a forwardly extending transport position, as is depicted in FIGS. 13 and 15.

In operation, the swing boom 40 is used to connect to a supply hose, but is not needed if the apparatus 10 is supported at the rear of a tank carrying a supply of liquid manure to be injected into the soil. The inlet port 18 of the apparatus 10 is either connected to the conduit of the swing boom 40 or directly to a connector hose of the tank. Either way, a supply of liquid manure to be injected into the soil is fed into the distribution hub 15 and discharged through the outlet ports 16 through hoses (not shown) into the discharge pipes 24 mounted on the individual injector units 20. The apparatus 10 is moved across a field with the opener disks 25 pressed into the soil to open a trench through rotation of the angled opener disk 25. As noted above, before operation, the opener disks 25 can be placed into a selected slanted orientation by the rotation of the spindle 26 on which the opener disk 25 is mounted, slanting the opener disk 25 between two and six degrees to define the width of the trench being formed in the soil.

Each discharge pipe 24 terminates in an asymmetrical boot 30 that is located beside the rearward edge of the corresponding opener disk 25 and operable to discharge liquid manure in a laminar flow pattern by the combination of a vertical side 31 and a slanted side 32 of the boot 30 into the formed trench immediately behind the lowermost periphery of the opener disk 25 that opens the trench. A containment disk 35, pivotally mounted on the frame structure of the adjacent injector unit 20, is angled and rotatable to laterally displace the soil placed on top of the ground by the opener disk 25 in forming the trench, and cover the opened trench immediately behind the boot 30 and contain the liquid manure below the surface of the ground. The mounting of the containment disks 35 on the adjacent injector unit 20 enables the injector units 20 to be compactly mounted on the transverse beam 11, with the containment disks 35 on the left side 11*a* of the beam 11 displacing soil to the left and the containment disks 35 on the right side displacing soil to the right. The center containment disks 39 are double mounted on support brackets 39 to facilitate the oppositely operable containment disks 35.

The apparatus 10 incorporating the principles of the instant inventions provides a compact apparatus for the injection of liquid manure into the ground, which is facilitated by the mounting of the containment disks 35 on the frame structure of the adjacent injector unit 20. The discharge pipes 24 are provided with asymmetrical boots 30 that have a vertical side 31 located beside the rearward periphery of the corresponding opener disk 25, and a slated side 32 that is angled toward the vertical side at the bottom of the boot to create a narrowed discharge opening that is places the liquid manure in a laminar flow pattern into the open trench immediately rearwardly of the opener disk 25. The opener disks 25 are mounted on a machined spindle 26 that has a support end 36*a* positionable in a mounting hub 27 that is fixed at a four degree angle relative to horizontal.

The cantilevered distal end 26*b* of the spindle 26 is machined to be oriented at a two degree bend with respect to the support end 26*a*. Therefore, when the spindle 26 is rotated to place the cantilevered end 27*b* vertically above the mounting hub 27, the slant of the opener disk 25 is at a six degree angle to open a wide trench. When the spindle 26 is rotated to be in horizontal alignment with the mounting hub 27, the opener disk 25 is slanted at the four degree inclination of the mounting hub 27. Similarly, when the spindle 26 is rotated to place the cantilevered end 26*b* below the mounting hub 27 the opener disk 25 is slanted at a two degree angle to open a narrow trench, which is typically used with liquid manure is to be injected into a field with growing crop so as to provide minimal disturbance and damage to the growing crop.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. An apparatus for injecting liquid manure into the ground, comprising:

a transverse beam having a mounting apparatus for connection thereof to a prime mover;

a plurality of injector units laterally mounted along said transverse beam, each said injector unit having an opener disk mounted for insertion into the ground to form a trench by displacing soil from the formed trench onto the surface of the ground adjacent thereto, a distribution pipe for inserting liquid manure into the open trench, and a containment disk trailing the distribution pipe to displace the soil place onto the surface of the ground back into the open trench to entrap the liquid manure within the trench beneath the surface of the ground; and each said containment disk displacing the soil placed onto the surface of the ground by the opener disk on the adjacent injector unit.

2. The apparatus of claim 1 wherein said apparatus has a longitudinal centerline with the containment disks located to the left of said centerline displacing soil to the left into the adjacent said formed trenches, and the containment disks to the right of said centerline displacing soil to the right into the adjacent said formed trenches.

3. The apparatus of claim 2 wherein said containment disks adjacent to said centerline are double mounted on a support bracket with the adjacent outboard containment disk.

4. The apparatus of claim 1 wherein said opener disks are mounted for selective positioning in variable slant angles to define a width dimension to the trench being formed thereby.

5. The apparatus of claim 4 wherein said opener disks are mounted on a spindle having a support end mounted in a mounting hub secured to the corresponding said injector unit at a selected angle of repose, said spindle having a distal end on which the corresponding said opener disk is rotatably mounted, said distal end being machined at a bend angle relative to said support end.

6. The apparatus of claim 5 wherein said spindle is selectively rotatable within said mounting hub to position the distal end of the spindle at a location that adds to the angle of repose by the bend angle, or to a location that subtracts the bend angle from the angle of repose, to selectively vary the slanted orientation of the opener disk mounted on said spindle.

7. The apparatus of claim 1 wherein each said discharge pipe terminates in an asymmetrically shaped boot having a vertical side and a slanted side angled downwardly toward said vertical side to define a narrowed discharge opening that directs liquid manure laterally into the trench opened by the operation of the opener disk.

8. An apparatus for injecting liquid manure into the ground, comprising:

a transverse beam having a mounting apparatus for connection thereof to a prime mover;

a plurality of injector units laterally mounted along said transverse beam, each said injector unit having an opener disk mounted for insertion into the ground to form a trench by displacing soil from the formed trench onto the surface of the ground adjacent thereto, a distribution pipe for inserting liquid manure into the open trench, and a containment disk trailing the distribution pipe to displace the soil place onto the surface of the ground back into the open trench to entrap the liquid manure within the trench beneath the surface of the ground; and each said opener disk being mounted on a machined spindle that extends outwardly from a canted hub for selective positioning in variable slant angles to define a width dimension to the trench being formed thereby, said spindle having a support end mounted in a mounting hub secured to the corresponding said injector unit at a selected angle of repose, said spindle having a distal end on which the corresponding said opener disk is rotatably mounted, said distal end being machined at a bend angle relative to said support end.

9. The apparatus of claim 8 wherein a plurality of said containment disks operably associated with corresponding injector units are mounted on the adjacent injector unit.

10. The apparatus of claim 9 wherein said apparatus has a longitudinal centerline with the containment disks located to the left of said centerline displacing soil to the left into said formed trenches, and the containment disks to the right of said centerline displacing soil to the right into said formed trenches.

11. The apparatus of claim 10 wherein said containment disks adjacent to said centerline are double mounted on a support bracket with the adjacent outboard containment disk.

12. The apparatus of claim 8 wherein each said discharge pipe terminates in an asymmetrically shaped boot having a vertical side and a slanted side angled downwardly toward said vertical side to define a narrowed discharge opening that directs liquid manure laterally into the trench opened by the operation of the opener disk.

13. The apparatus of claim 12 wherein said boot deflects the liquid manure into a laminar flow pattern directed into the opened trench.

14. The apparatus of claim 12 wherein said discharge pipe is pivotally supported to permit vertical movement when encountering an obstacle on the ground, said discharge pipe having a reset spring connected to said discharge pipe to bias said discharge pipe into a lowered operating position.

15. An apparatus for injecting liquid manure into the ground, comprising:

a transverse beam having a mounting apparatus for connection thereof to a prime mover;

a plurality of injector units laterally mounted along said transverse beam, each said injector unit having an opener disk mounted for insertion into the ground to form a trench by displacing soil from the formed trench onto the surface of the ground adjacent thereto, a distribution pipe for inserting liquid manure into the open trench, and a containment disk trailing the distribution pipe to displace the soil place onto the surface of the ground back into the open trench to entrap the liquid manure within the trench beneath the surface of the ground; and each said discharge pipe terminating in an asymmetrically shaped boot having a longitudinally extending vertical side and a laterally opposing, longitudinally extending slanted side angled downwardly toward said vertical side to define a narrowed discharge opening that directs liquid manure into a laminar flow pattern laterally into the trench opened by the operation of the opener disk.

16. The apparatus of claim 15 wherein said opener disks are mounted on a spindle having a support end mounted in a mounting hub secured to the corresponding said injector unit at a selected angle of repose, said spindle having a distal end on which the corresponding said opener disk is rotatably mounted, said distal end being machined at a bend angle relative to said support end, thereby permitting selective positioning in variable slant angles to define a width dimension to the trench being formed thereby.

17. The apparatus of claim 15 wherein a plurality of said containment disks operably associated with corresponding injector units are mounted on adjacent injector units, said apparatus having a longitudinal centerline with the containment disks located to the left of said centerline displacing soil to the left into said formed trenches, and the containment disks to the right of said centerline displacing soil to the right into said formed trenches.

18. The apparatus of claim 15 wherein each said discharge pipe includes a breakaway mechanism comprising:

a pivotal support of the discharge pipe about a horizontal pivot;

a reset spring connected to said discharge pipe to bias said discharge pipe into an operating position, said reset spring allowing said discharge pipe to rise vertically when said discharge pipe encounters an immovable object, said reset spring returning said discharge pipe to said operating position after said discharge pipe passes over the immovable object.

* * * * *